United States Patent
Norrell et al.

(10) Patent No.: US 6,529,549 B1
(45) Date of Patent: Mar. 4, 2003

(54) SYSTEM AND METHOD FOR AN EQUALIZER-BASED SYMBOL TIMING LOOP

(75) Inventors: Andrew L. Norrell, Nevada City, CA (US); Scott Lery, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 111 days.

(21) Appl. No.: 09/627,217

(22) Filed: Jul. 27, 2000

(51) Int. Cl.[7] .................................................. H03H 7/03
(52) U.S. Cl. .......................... 375/229; 375/232; 375/355
(58) Field of Search ................................. 375/229, 231, 375/232, 233, 293, 294, 346, 354, 355, 358, 365, 375; 370/503, 509, 510, 511, 512, 514

(56) References Cited

U.S. PATENT DOCUMENTS

| | | | | |
|---|---|---|---|---|
| 5,018,166 A | * | 5/1991 | Tjahjadi et al. | 375/12 |
| 5,499,268 A | * | 3/1996 | Takahashi | 375/231 |
| 5,710,792 A | * | 1/1998 | Fukawa et al. | 375/229 |
| 6,201,832 B1 | * | 3/2001 | Choi | 375/233 |
| 6,208,481 B1 | * | 3/2001 | Spurbeck et al. | 360/65 |
| 6,335,949 B1 | * | 1/2002 | Kim | 375/232 |

* cited by examiner

*Primary Examiner*—Chi Pham
*Assistant Examiner*—Khanh Tran
(74) *Attorney, Agent, or Firm*—Carr & Ferrell LLP

(57) ABSTRACT

An equalizer based symbol timing loop system incorporates existing receiver architecture to modify an input sample stream to match a transmitter's symbol rate. The system includes a phase detector that identifies a center tap in a linear equalizer in the receiver and then captures the value of the center tap at the beginning and end of a measurement period. The phase detector then multiples the captured value of the center tap at the end of the measurement period by the conjugate of the captured center tap value at the beginning of the measurement period. The phase detector then takes the arc tangent of the multiplication result. A loop filter coupled to the phase detector multiples the arc tangent result by a scalar and adds the result to a frequency difference estimate. A coefficient generator then determines the interpolation phase for an input sample stream based on the frequency difference estimate and generates interpolator coefficients based on the interpolation phase. A timing interpolator filter coupled to the coefficient generator receives the input sample stream and interpolator coefficients and modifies the input sample stream to match the transmitter's symbol rate.

17 Claims, 3 Drawing Sheets

SYSTEM AND METHOD FOR AN EQUALIZER-BASED SYMBOL TIMING LOOP

CROSS REFERENCE TO RELATED APPLICATION

This application relates to commonly assigned U.S. Provisional Patent Application No. 60/202,081, filed on May 4, 2000 and entitled "Interpolating Bandpass Filter for Packet-Data Receiver Synchronization" by Carl H. Alelyunas and Philip DesJardins, the disclosure of which is hereby incorporated by reference.

BACKGROUND

1. Technical Field

The present invention relates generally to computer networking devices and, more particularly to a data packet receiver configured to approximate and adapt for timing differences with a transmitter.

2. Description of the Background Art

Many network receivers, such as those configured to receive data formatted according to Home Phoneline Network Alliance (HomePNA or HPNA) standards, are packet-based. Typically, these receivers operate at about 2 million or 4 million symbols per second, receiving between 2 and 8 bits per symbol, with effective burst data rates of between about 4 million to 32 million bits per second (Mbps). These receivers operate in packet mode, which generally means that the transmissions are not continuous. Rather, the transmissions are only long enough to deliver between about 64 and 1518 bytes.

Consequently, these receivers advantageously train quickly upon receiving the beginning of each packet in order to properly decode the data in the packet, ideally at as high a data rate as possible. Frequently, the first two segments of a packet are used for training the receiver and comprise only 136 symbols total at 2 million symbols per second (2 Megabaud), or 68 microseconds duration. The associated data payload typically lasts from about 16 to 3796 microseconds.

Unfortunately, the time bases between a receiver and transmitter typically differ by as much as 200 parts per million (ppm). One cause of this difference is due to the relatively inexpensive crystal oscillators that are commonly used to generate master clocks for these devices. For many of these inexpensive crystal oscillators, a maximum error of about 100 ppm is common due to temperature changes and aging. Since a typical data packet network, such as a HomePNA network, can have multiple transmitting devices, a single receiver may receive data from transmitters with significantly different time bases.

The difference in time bases between the receiver and transmitter can seriously degrade the performance of the receiver. For example, assume that a receiver's local time base is 100 ppm slow compared to a transmitter's time base. This means that the incoming symbols seem faster by 0.01% than the receiver's local clock, assuming that the local clock is not corrected. Over the course of a 1,000-symbol packet, the local clock will slip by 0.1 symbols, which may be enough to cause major degradation in the receiver. Specifically, the receiver's carrier will rotate nominally through 3.5 cycles per symbol (7 millions cycles/second divided by 2 million symbols/second) but the receiver's carrier, due to the uncorrected timing difference, will rotate through 3,499.65 cycles (3500*(1−0.0001) cycles) instead of 3,500 cycles over the 1,000-symbol packet due to the receiver's slow clock. This leads to an angular error of 0.35 cycles, or 126 degrees, over the course of the 1,000-symbol packet. Since the receiver is decoding dense constellations where points can be separated by as little as four degrees, receiver performance may be seriously degraded.

To attempt to compensate for this timing difference, conventional receivers sometime employ a mechanism for creating a virtual clock that tracks the transmitter's clock (or the transmitter's symbol rate or a multiple of the transmitter's symbol rate). In order for the virtual clock to track the transmitter's clock, some conventional receivers generally require some type of error signal that indicates the difference between the local virtual clock and the transmit symbol clock. There are a number of conventional techniques to extract this error signal. One of these techniques is commonly referred to as Envelope Derived Timing (EDT), which generally measures the phase of the incoming signal's power envelope relative to a local clock. Band Edge Component Maximization (BECM) is a specific EDT technique that is often used in modem receivers that train and remain active over many thousands or millions of symbols periods. This technique is generally data-pattern-dependent unless the receiver averages the measurement over a long period to take advantage of the long-term statistics of the transmit data. However, in some applications this process is too slow to be used effectively with short data packets, such as of HPNA data packets.

Another limitation with some network receivers is that the signal processing functions are primarily implemented in hardware. Consequently, any timing error detector that is significantly complex will significantly increase hardware complexity, design cycles, and final product cost.

SUMMARY

The present system and method overcome or substantially alleviate receiver degradation caused by differences between a transmitter's clock and a receiver's local clock by incorporating a phase detector, or error detector, into the receiver. In general, the present system and method determine the frequency offset between a transmitter and a receiver according to the angular change of an adaptive equalizer center tap over a predetermined period.

One embodiment of the present system uses a linear equalizer, which is constructed as a finite impulse response ("FIR") filter, to measure the rotational error in a channel of the receiver. Specifically, the linear equalizer generates coefficients over time in order to minimize equalizer error (the difference between received points and decisions). The changes in these coefficients over time is an observable metric that indicates carrier frequency error. The rate of rotation of the coefficients can be observed by measuring the change in angle of the center tap of the linear equalizer over a predefined interval (for example, 32 symbol periods). The frequency error is determined by dividing the change in angle by the time interval.

Once the frequency error is determined, a coefficient generator determines the interpolation phase of an input sample stream based on the frequency error (or frequency difference estimate) and generates interpolator coefficients to modify the input sample stream. The coefficients are fed into a timing interpolating filter ("TIF") that is located between the receiver's analog to digital converter ("ADC") and the receiver's low pass filter ("LPF"). The TIF modifies the effective sample rate of the ADC stream to match the sample rate of the transmitter's digital to analog converter ("DAC"). Accordingly, the local carrier frequency reference for demodulation at the LPF is substantially equal to the transmit carrier frequency used for modulation, and the angular rotational error and associated receiver degradation stops.

Other advantages and features of the present invention will be apparent from the drawings and detailed description as set forth below.

DETAILED DESCRIPTION OF THE PREFERRED EMBODIMENT

Figure 1:
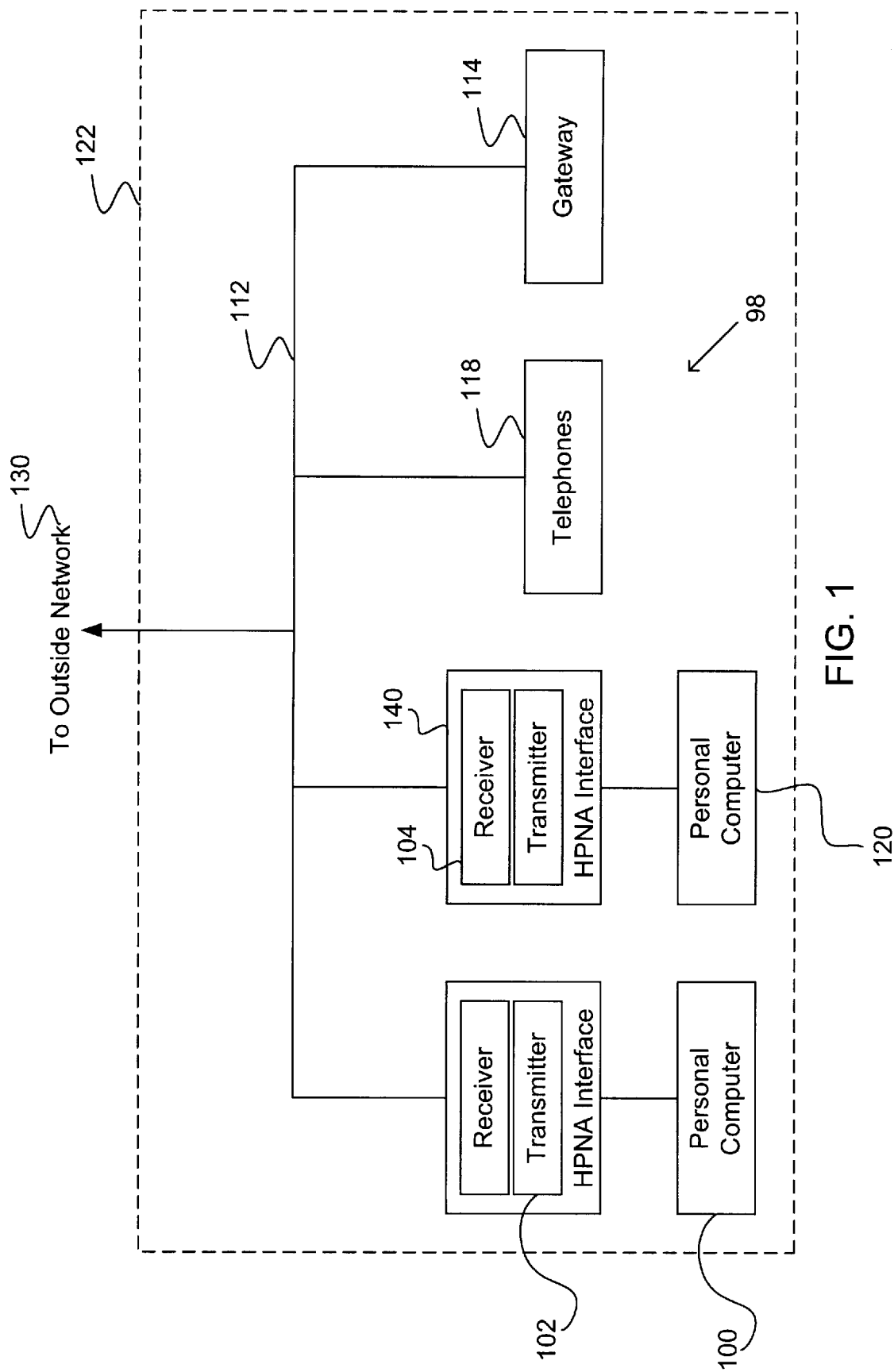
FIG. 1 is a block diagram illustrating a home telephone wiring network.

FIG. 1 is a block diagram illustrating a home telephone wiring network 98 that includes a transmitter, such as a HomePNA transmitter, 102 coupled to a personal computer 100, a receiver, such as a HomePNA receiver, 104 in an Interface 140 coupled to a personal computer 120, telephones 118, and a residential gateway device 114 all disposed in a building, such as a home 122. As shown, the home telephone wiring network 98 is coupled to an outside network 130, which is coupled to a central office. Transmitter 102 and receiver 104, which will be discussed further below, transmit and receive data packet signals, such as those in accordance with Home Phoneline Networking Alliance (HPNA) standards.

Figure 2:
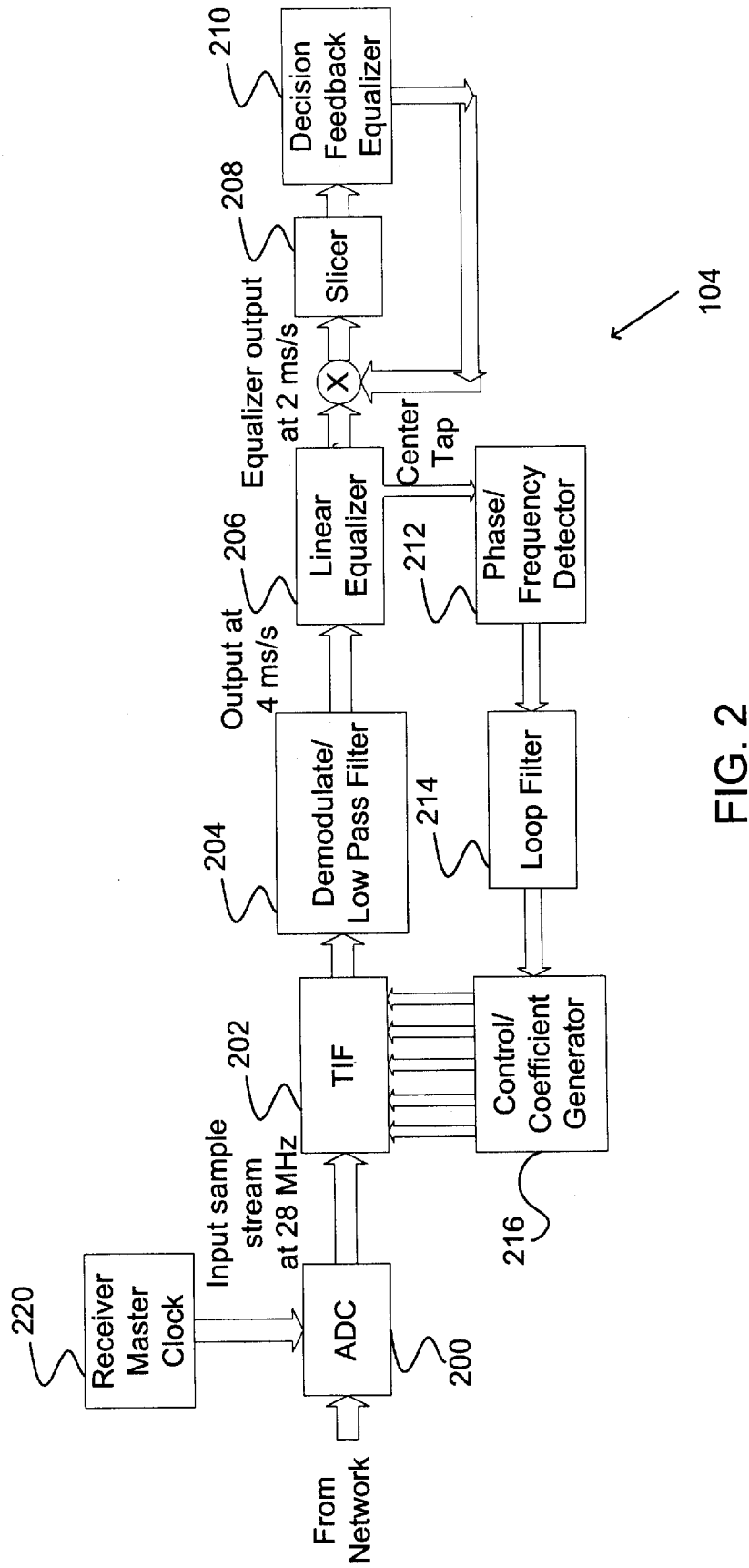
FIG. 2 is a block diagram illustrating an equalizer based timing loop in the receiver of FIG. 1.

FIG. 2 is a block diagram illustrating an equalizer based timing loop of the receiver 104 of FIG. 1. A receiver master clock 220 generates a 28 MHz clock to drive the analog to digital converter ("ADC") 200. ADC 200 receives from transmitter 102 (FIG. 1) an analog waveform via the network 112. The ADC 200 converts the received analog waveform into a digital signal sampled at the 28 MHz rate provided by the receiver master clock 220. However, the 28 MHz clock generated by the receiver master clock 220 will probably have a different time base than the transmitter master clock (not shown) of the transmitter 102 that was used in generating the analog waveform. (Note that the transmitter master clock may not use a 28 MHz clock, but instead may use some other frequency that can be divided down to produce a 2 MB or 4 MB symbol timing reference and a 7 MHz carrier waveform). In fact, the receiver master clock 100 may differ from the transmitter master clock by as much 200 parts per million ("ppm") assuming one clock is 100 ppm slow and the second clock is 100 ppm fast.

Timing interpolator filter ("TIF") 202 receives the 28 MHz digital signal, which was generated by the ADC 200, and synchronizes the signal to the symbol rate (either 2 MB or 4 MB) of the transmitter 102. Further, TIF 202 corrects for two primary effects of timing error: symbol duration and carrier frequency. Additional details of the TIF 202 are described in copending U.S. Provisional Patent Application No. 60/202,081 and will be discussed in further detail in conjunction with FIG. 3.

Demodulator/Low Pass Filter 204 first multiplies the output signal of the TIF 202 by a sinusoid equal to approximately the carrier frequency of the transmitter 102 (FIG. 1). The receiver's 104 estimate of the transmitter's carrier frequency is based on the receiver's 104 recovered clock, which is synchronized to transmitter's 102 clock as much as possible. Second, the demodulator/low pass filter 204 demodulates the signal output by TIF 202 into its real and imaginary components. The demodulator/low pass filter 204 and carrier frequency estimation functionality will be discussed in further detail in conjunction with FIG. 3.

Demodulator/low pass filter 204 then presents the filtered signals to the linear equalizer 206, which removes intersymbol interference. Slicer 208 slices the equalized signals to equidistant levels to create restored symbols. Decision feedback equalizer 210 provides feedback to slicer 208 so that slicer 208 can more efficiently create restored symbols.

Phase detector 212 identifies and captures the center tap of the linear equalizer 206, multiples the center tap by the conjugate of the previously captured center tap value, and then takes the arc tangent of the result. Phase detector 212 and its operation will be discussed in further detail in conjunction with FIG. 3.

Loop filter 214 multiples the arc tangent (i.e., the output of the phase detector 202) by a scalar and then adds the result to a previously established frequency difference estimate, which may be initially set to a default estimate, such as zero. The frequency difference estimate is the difference between the frequency of the samples actually transmitted by transmitter 102 and the frequency of the samples produced by TIF 202 if no action was taken to correct for receiver 104 degradation. For example, the sampling rate of receiver 104 may be 28 MHz while the sampling rate of transmitter 102 is 50 ppm faster, or 28.001400 MHz, i.e., a frequency difference of 0.001400 MHz. Accordingly, to decrease receiver 104 degradation, the present system may advantageously produce samples at 28.001400 MHz, or 50 ppm faster. Specifically, TIF 202 may advantageously produce 28,001,400 samples for every 28,000,000 samples received (or 2001 samples out for every 2000 in). Loop filter 214 will be discussed in further detail in conjunction with FIG. 3.

Coefficient generator 216 determines the appropriate interpolation phase for each output sample based on the frequency difference estimate determined by the loop filter 214. Coefficient generator 216 then generates interpolator coefficients, which it then outputs to TIF 202. Coefficient generator 216 will be discussed in further detail in conjunction with FIG. 3.

Figure 3:
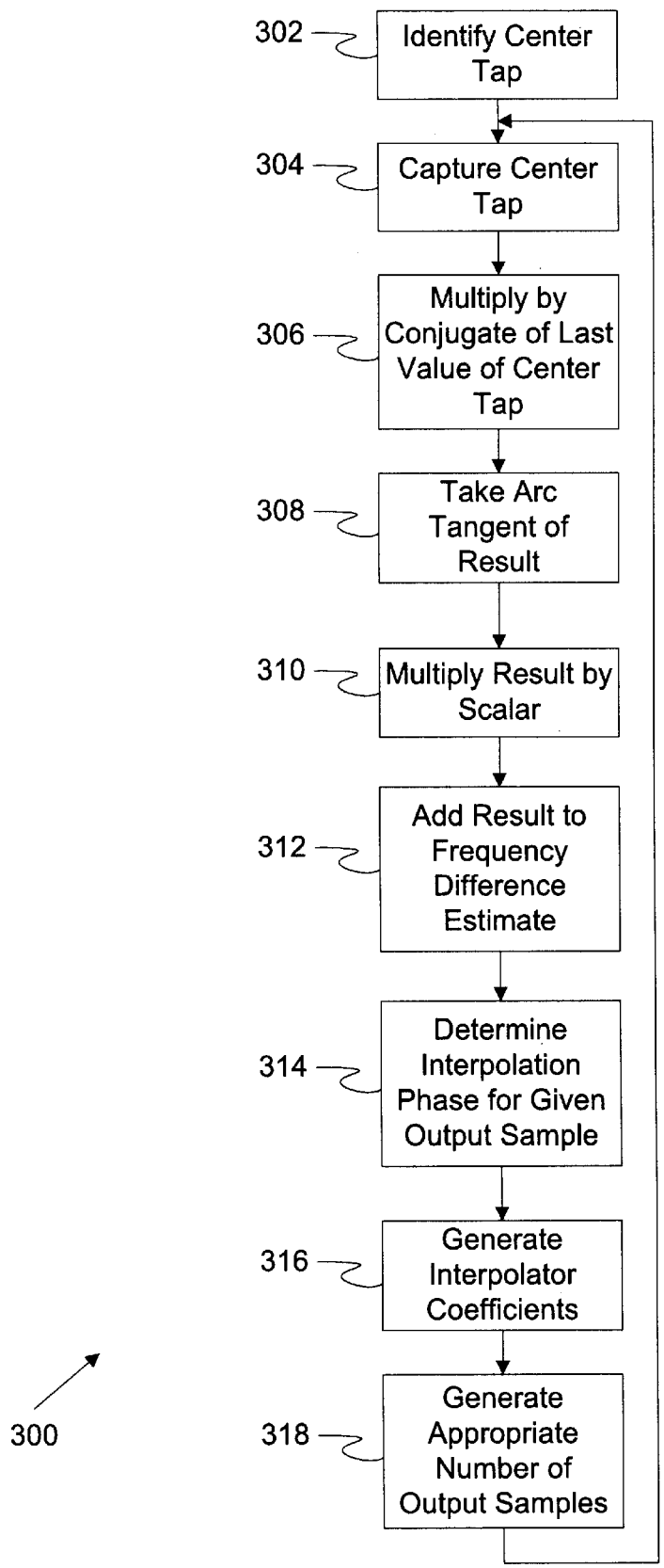
FIG. 3 is a flowchart illustrating a method of modifying an input sample stream to match a transmitter's symbol rate.

FIG. 3 is a flowchart illustrating a method of modifying an input sample stream to match a transmitter's symbol rate. At step 302, the phase detector 212 identifies the center tap (largest coefficient) in linear equalizer 206 by identifying the largest squared magnitude of the coefficients in the linear equalizer 206.

At step 304, phase detector 212 captures the value of the center tap at the start of the measurement period ($Cc(n-1)$) and at the end of the measurement period ($Cc(n)$). In the preferred embodiment, the measurement period is 32 symbols long. At step 306, phase detector 212 multiplies the captured value of the center tap at the beginning of the measurement period by the conjugate of the captured value of the center tap at the end of the measurement period, i.e., $Cc(n-1)*conj[Cc(n)]$, which is equal to the phase change estimate, $X(n)$.

At step 308, phase detector 212 takes the arc tangent of the phase change estimate $X(n)$, which yields the frequency difference estimate, $\theta(n)$. At step 310, loop fitter 214 multiples $\theta(n)$ by a scalar, $\alpha$. $\alpha$ is a constant, typically less than 1.0 and chosen to give the receiver 104 desirable behavior. This scalar, $\alpha$, is typically selected empirically based on simulation data and later confirmed and possibly readjusted on real hardware. At step 312, loop filter 214 adds the results of α*θ(n) to the previously established frequency difference estimate to yield a more accurate frequency difference estimate, i.e., F.E.(n)=F.E.(n−1)+α*θ(n). Accordingly, the calculation of the frequency difference estimate can be summarized as F.E.(n)=F.E.(n−1)+α* arc tan [(Cc(n)*conj (Cc(n−1))].

The initial frequency difference estimate, i.e., F.E.(0) is generated via conventional means and can produce a timing estimate that is within 10–15% of the correct value. Each time F.E.(n) is updated (after each measurement period of 32 symbols), the residual error drops until it is eventually zero or non-evident, thereby ensuring that the receiver's clock matches the transmitter's clock.

At step 314, coefficient generator 216 determines the interpolation phase for a given output sample based on the desired frequency (i.e., 28 MHz plus the frequency difference estimate, F.E.(n)). At step 316, coefficient generator 216 generates the interpolator coefficients necessary to generate an output sample stream at the desired frequency and feeds these coefficients to TIF 202. At step 318, TIF 202 generates the appropriate number of output samples according to the desired frequency. The method 300 then returns to step 304 and repeats the process for the next 32 symbols.

The invention has been described above with reference to a specific embodiment. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An equalizer based symbol timing loop for use in a receiver, comprising:
    a linear equalizer for removing inter-symbol interference;
    a phase detector coupled to the linear equalizer for identifying a center tap of the linear equalizer, capturing the center tap at a the beginning and end of a measurement period, multiplying the captured value of the center tap at the beginning of the measurement period by the conjugate of the captured value of the center tap at the end of the measurement period, and calculating the arc tangent of the multiplication result;
    a loop filter coupled to the phase detector for multiplying the arc tangent result by a scalar and adding the scalar-multiplied result to a frequency difference estimate;
    a coefficient generator coupled to the loop filter for determining an interpolation phase for a given sample stream based on the frequency difference estimate and generating interpolator coefficients based on the interpolation phase; and
    a timing interpolator filter coupled to the coefficient generator for receiving the interpolator coefficients and modifying the sample stream to match a transmitter's symbol rate.

2. The equalizer based symbol timing loop of claim 1 wherein the measurement period is 32 symbols.

3. The equalizer based symbol timing loop of claim 2 wherein the scalar is less than 1.0.

4. The equalizer based symbol timing loop of claim 3 wherein an initial frequency difference estimate is within 15% of the actual error.

5. The equalizer based symbol timing loop of claim 4 wherein the equalizer is constructed as a FIR filter.

6. A method for modifying a sample stream to match a transmitter's symbol rate comprising the steps of:
    identifying a center tap of a linear equalizer;
    capturing the center tap at the beginning and end of a measurement period;
    multiplying the captured value of the center tap at the beginning of the measurement period by the conjugate of the captured value of the center tap at the end of the measurement period;
    calculating the arc tangent of the multiplication result;
    multiplying the arc tangent calculation by a scalar;
    adding the scalar multiplied calculation to a frequency difference estimate;
    determining an interpolation phase for the sample stream based on the frequency difference estimate;
    generating interpolator coefficients based on the interpolation phase;
    modifying the sample stream with the interpolator coefficients; and
    repeating the capturing through modifying steps for subsequent sample streams.

7. The method of claim 6 wherein the measurement period is 32 symbols.

8. The method of claim 7 wherein the scalar is less than 1.0.

9. The method of claim 8 wherein an initial frequency difference estimate is within 15% of the transmitter's symbol rate.

10. The method of claim 9 further comprising the step of removing inter-symbol interference from the sample stream with the linear equalizer.

11. The method of claim 10 wherein said equalizer is structured as a FIR filter.

12. An equalizer based symbol timing loop for modifying a sample stream to match a transmitter's symbol rate comprising:
    means for identifying a center tap of a linear equalizer;
    means for capturing the center tap at the beginning and end of a measurement period;
    means for multiplying the captured value of the center tap at the beginning of the measurement period by the conjugate of the captured value of the center tap at the end of the measurement period;
    means for calculating the arc tangent of the multiplication result;
    means for multiplying the arc tangent calculation by a scalar;
    means for adding the scalar multiplied calculation to a frequency difference estimate;
    means for determining an interpolation phase for the sample stream based on the frequency difference estimate;
    means for generating interpolator coefficients based on the interpolation phase; and
    means for modifying the sample stream with the interpolator coefficients.

13. The equalizer based symbol timing loop of claim 12 wherein the measurement period is 32 symbols.

14. The equalizer based symbol timing loop of claim 13 wherein the scalar is less than 1.0.

15. The equalizer based symbol timing loop of claim 14 wherein an initial frequency difference estimate is within 15% of the transmitter's symbol rate.

16. The equalizer based symbol timing loop of claim 15 further comprising means for removing inter-symbol interference.

17. The equalizer based symbol timing loop of claim 16 wherein the means for removing inter-symbol interference is structured as a FIR filter.

* * * * *